US010915452B2

(12) United States Patent
Sharma et al.

(10) Patent No.: US 10,915,452 B2
(45) Date of Patent: Feb. 9, 2021

(54) METHOD, SYSTEM, AND COMPUTER PROGRAM PRODUCT FOR MAINTAINING A CACHE

(71) Applicant: Visa International Service Association, San Francisco, CA (US)

(72) Inventors: Abhinav Sharma, Austin, TX (US); Sonny Thanh Truong, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/445,411

(22) Filed: Jun. 19, 2019

(65) Prior Publication Data

US 2020/0401528 A1 Dec. 24, 2020

(51) Int. Cl.
*G06F 12/0891* (2016.01)
*G06F 3/06* (2006.01)

(52) U.S. Cl.
CPC ........ *G06F 12/0891* (2013.01); *G06F 3/0608* (2013.01); *G06F 3/0658* (2013.01); *G06F 3/0673* (2013.01)

(58) Field of Classification Search
CPC .................................................. G06F 12/0891
See application file for complete search history.

(56) References Cited

U.S. PATENT DOCUMENTS

| 7,318,124 | B2 | 1/2008 | Hama et al. | |
| 10,466,217 | B1 * | 11/2019 | Sayfan | ............... G01N 33/0075 |
| 2014/0289332 | A1 * | 9/2014 | Frosst | ................. G06F 12/0862 709/204 |
| 2017/0052976 | A1 | 2/2017 | Verma et al. | |
| 2017/0139833 | A1 * | 5/2017 | Barajas Gonzalez | ... G06F 12/08 |
| 2020/0167374 | A1 * | 5/2020 | Schauder | .............. G06F 16/288 |

OTHER PUBLICATIONS

Alici et al., "Timestamp-based Result Cache Invalidation for Web Search Engines", SIGIR'11, Jul. 2011, Beijing, China, pp. 973-982.
Kucukyilmaz et al., "A machine learning approach for result caching in web search engines", Information Processing and Management, vol. 53, 2017, pp. 834-850.

* cited by examiner

*Primary Examiner* — Edward J Dudek, Jr.
(74) *Attorney, Agent, or Firm* — The Webb Law Firm

(57) ABSTRACT

A method, system, and computer program product for maintaining a cache obtain request data associated with a plurality of previously processed requests for aggregated data; predict, based on the request data, (i) a subset of the aggregated data associated with a subsequent request and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period.

17 Claims, 4 Drawing Sheets

METHOD, SYSTEM, AND COMPUTER PROGRAM PRODUCT FOR MAINTAINING A CACHE

BACKGROUND

1. Field

This disclosure relates generally to systems, devices, products, apparatus, and methods that are used for maintaining a cache, and in some embodiments or aspects, to a method, a system, and a product for invalidating and loading a cache using previously processed requests.

2. Technical Considerations

Distributed cache may include a cache storage that has been configured across multiple nodes and/or servers within a same network, which store similar data request information. Distributed cache may be used in various cases to improve the performance of an application. However, existing algorithms for invaliding a cache (e.g., Least Recently Used (LRU), Time to Live (TTL), etc.) may have drawbacks and/or limitations because they are based on static empirical formulations. Accordingly, there is a need for improved maintenance of a cache.

SUMMARY

Accordingly, provided are improved systems, devices, products, apparatus, and/or methods for maintaining a cache.

According to some non-limiting embodiments or aspects, provided is a computer-implemented method, including: obtaining, with at least one processor, request data associated with a plurality of previously processed requests for aggregated data; predicting, with at least one processor, based on the request data, (i) a subset of the aggregated data associated with a subsequent request and (ii) a first time period associated with the subsequent request; determining, with at least one processor, based on the first time period and a second time period associated with a performance of a data aggregation operation that generates the aggregated data, a third time period associated with instructing a memory controller managing a cache to evict cached data stored in the cache and load the subset of the aggregated data into the cache; and providing, with at least one processor, an invalidation request to the memory controller managing the cache to evict the cached data stored in the cache and load the subset of the aggregated data into the cache during the third time period.

According to some non-limiting embodiments or aspects, provided is a computing system including: one or more processors programmed and/or configured to: obtain request data associated with a plurality of previously processed requests for aggregated data; predict, based on the request data, (i) a subset of the aggregated data associated with a subsequent request and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period.

According to some non-limiting embodiments or aspects, provided is a computer program product including at least one non-transitory computer-readable medium including program instructions that, when executed by at least one processor, cause the at least one processor to: obtain request data associated with a plurality of previously processed requests for aggregated data; predict, based on the request data, (i) a subset of the aggregated data associated with a subsequent request and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period.

In some non-limiting embodiments or aspects, the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

In some non-limiting embodiments or aspects, the subsequent request is a first request predicted to be received after completion of the performance of the data aggregation operation.

In some non-limiting embodiments or aspects, the data aggregation operation is performed periodically to generate the aggregated data.

In some non-limiting embodiments or aspects, the plurality of previously processed requests is associated with a plurality of requesting systems, the subsequent request includes a plurality of subsequent requests associated with the plurality of requesting systems, the plurality of requesting systems is associated with a plurality of priority levels, and the third time period is further determined based on the plurality of priority levels.

In some non-limiting embodiments or aspects, the data aggregation operation includes a plurality of data aggregation operations associated with the plurality of requesting systems, and determining the third time period further includes modifying at least one data aggregation operation associated with at least one requesting system of the plurality of requesting systems based on the plurality of priority levels.

In some non-limiting embodiments or aspects, the aggregated data is associated with a plurality of transactions, the aggregated data includes at least one metric associated with a requesting system, and the at least one metric includes an aggregation of at least one transaction parameter over the plurality of transactions associated with that requesting system.

Further embodiments or aspects are set forth in the following numbered clauses:

Clause 1. A computer-implemented method, comprising: obtaining, with at least one processor, request data associated with a plurality of previously processed requests for aggregated data; predicting, with at least one processor, based on the request data, (i) a subset of the aggregated data associated with a subsequent request and (ii) a first time period associated with the subsequent request; determining, with at least one processor, based on the first time period and a second time period associated with a performance of a data aggregation operation that generates the aggregated data, a third time period associated with instructing a memory controller managing a cache to evict cached data stored in the cache and load the subset of the aggregated data into the cache; and providing, with at least one processor, an invalidation request to the memory controller managing the cache to evict the cached data stored in the cache and load the subset of the aggregated data into the cache during the third time period.

Clause 2. The computer-implemented method of clause 1, wherein the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

Clause 3. The computer-implemented method of any of clauses 1 and 2, wherein the subsequent request is a first request predicted to be received after completion of the performance of the data aggregation operation.

Clause 4. The computer-implemented method of any of clauses 1-3, wherein the data aggregation operation is performed periodically to generate the aggregated data.

Clause 5. The computer-implemented method of any of clauses 1-4, wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, and wherein determining the third time period is further based on the plurality of priority levels.

Clause 6. The computer-implemented method of any of clauses 1-5, wherein the data aggregation operation includes a plurality of data aggregation operations associated with the plurality of requesting systems, and wherein determining the third time period further includes modifying at least one data aggregation operation associated with at least one requesting system of the plurality of requesting systems based on the plurality of priority levels.

Clause 7. The computer-implemented method of any of clauses 1-6, wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

Clause 8. A computing system comprising: one or more processors programmed and/or configured to: obtain request data associated with a plurality of previously processed requests for aggregated data; predict, based on the request data, (i) a subset of the aggregated data associated with a subsequent request and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period.

Clause 9. The computing system of clause 8, wherein the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

Clause 10. The computing system of any of clauses 8 and 9, wherein the subsequent request is a first request predicted to be received after completion of the performance of the data aggregation operation.

Clause 11. The computing system of any of clauses 8-10, wherein the data aggregation operation is performed periodically to generate the aggregated data.

Clause 12. The computing system of any of clauses 8-11, wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, and wherein the third time period is further determined based on the plurality of priority levels.

Clause 13. The computing system of any of clauses 8-12, wherein the data aggregation operation includes a plurality of data aggregation operations associated with the plurality of requesting systems, and wherein the one or more processors further determine the third time period by modifying at least one data aggregation operation associated with at least one requesting system of the plurality of requesting systems based on the plurality of priority levels.

Clause 14. The computing system of any of clauses 8-13, wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

Clause 15. A computer program product comprising at least one non-transitory computer-readable medium including program instructions that, when executed by at least one processor, cause the at least one processor to: obtain request data associated with a plurality of previously processed requests for aggregated data; predict, based on the request data, (i) a subset of the aggregated data associated with a subsequent request and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period.

Clause 16. The computer program product of clause 15, wherein the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

Clause 17. The computer program product of any of clauses 15 and 16, wherein the subsequent request is a first request predicted to be received after completion of the performance of the data aggregation operation.

Clause 18. The computer program product of any of clauses 15-17, wherein the data aggregation operation is performed periodically to generate the aggregated data.

Clause 19. The computer program product of any of clauses 15-18, wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, wherein the third time period is further determined based on the plurality of priority levels, wherein the data aggregation operation includes a plurality of data aggregation operations associated with the plurality of requesting systems, and wherein the one or more processors further determine the third time period by modifying at least one data aggregation operation associated with at least one requesting system of the plurality of requesting systems based on the plurality of priority levels.

Clause 20. The computer program product of any of clauses 15-19, wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1:
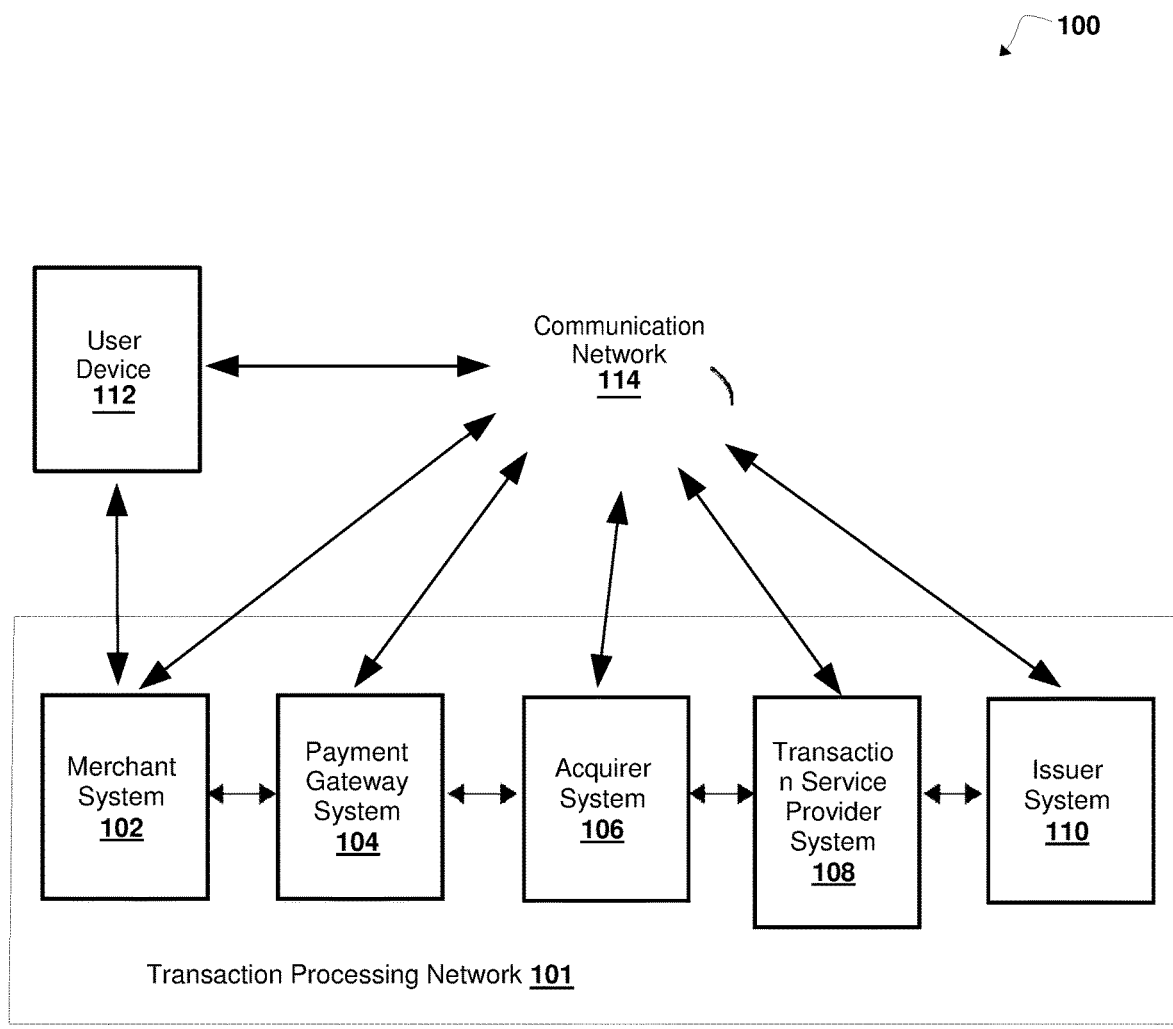
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for maintaining a cache.

Merchant systems may use an analytics API to receive and/or retrieve transactional insights from a payment processing network. The analytics API may receive and/or retrieve data from a relational database (e.g., an Oracle RDBMS, etc.), which provides a daily aggregated view of transactions. For example, metrics for historical transactions for a merchant system (and/or a group of merchant systems) may be received and/or updated on a daily basis due to times associated with extract, transform, and load (ETL) operations for aggregating the transaction data for each merchant. As an example, a service level agreement (SLA) with a merchant may be set to provide 24 hours old aggregated transaction data because the aggregation ETL takes a relatively long time to provide the aggregated transaction data for each merchant. In such an example, a buffer of 24 hours is maintained to ensure that the ETL operation has run successfully for each merchant. The aggregated transaction data may be cached to improve the performance of the analytics API. However, as previously described herein, existing systems for invaliding a cache (e.g., Least Recently Used (LRU), Time to Live (TTL), etc.) may have drawbacks and/or limitations because they are based on static empirical formulations. In this way, existing cache invalidation systems fail to provide a mechanism for (i) invalidating/refreshing a cache after a data aggregation operation (e.g., after a daily ETL operation, etc.) at a time less likely to delay a request from a requesting system (e.g., a merchant system, etc.), (ii) pre-caching transaction data predicted to be requested in a first network access request from the requesting system after the cache invalidation/refresh, which may cause a need for a slower database call to retrieve the requested data, and (iii) refreshing valuable cache resources without waiting for cache to expire (e.g., according to a time-to-live algorithm, etc.). Accordingly, a data aggregation operation (e.g., an ETL operation, etc.) may not be completed and the results sets thereof may not be cached in a distributed cache within a window provided between the data aggregation operations, which may degrade computing performance and monopolize system resources.

Non-limiting embodiments or aspects of the present disclosure are directed to systems, methods, and computer program products for maintaining a cache that obtain request data associated with a plurality of previously processed requests for aggregated data; predict, based on the request data, (i) a subset of the aggregated data associated with a subsequent request, and (ii) a first time period associated with the subsequent request; determine, based on the first time period and a second time period associated with a performance of a data aggregation operation that generates the aggregated data, a third time period associated with instructing a memory controller managing a cache to evict cached data stored in the cache and load the subset of the aggregated data into the cache; and provide an invalidation request to the memory controller managing the cache to evict the cached data stored in the cache and load the subset of the aggregated data into the cache during the third time period. For example, metrics for historical transactions for a merchant system (or a group of merchant systems) may be received/updated on a daily basis due to ETL times associated with aggregating the transaction data for each merchant, analytics/metrics for network access requests by the merchant for accessing the transaction data may be received, and, based on the transaction metrics and network analytics, a neural network may be trained and used to predict/determine (i) an invalidation/refresh period for a cache (e.g., a period in time when the merchant is less likely to request network access for transaction data, such as a period in time when transactions are less likely to be received/processed by the merchant) and (ii) a subset or type of transaction data to recache (e.g., specific transaction data likely to be requested by the merchant subsequent to invalidating/refreshing the cache). In this way, non-limiting embodiments or aspects of the present disclosure provide for (i) invalidating/refreshing a cache after a data aggregation operation (e.g., between daily ETL operations, etc.) at a time less likely to delay a request from a requesting system (e.g., a merchant system, etc.), (ii) pre-caching transaction data predicted to be requested in a first network access request from the requesting system after the cache invalidation/refresh, which may eliminate a need for a slower database call to retrieve the requested data, and (iii) refreshing valuable cache resources without waiting for cache to expire (e.g., according to a time-to-live algorithm, etc.). Accordingly, a data aggregation operation (e.g., an ETL operation, etc.) may be completed and the results sets cached in a distributed cache for boosting the performance of an analytics API within the window provided by the aggregation operation.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system. In some non-limiting embodiments or aspects, a requesting system that requests and/or retrieves aggregated data and/or transaction data from an analytics API may include merchant system 102.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data, request data aggregated data, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112. In some non-limiting embodiments or aspects, user device 112 may include requesting user device 151.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices or systems of environment 100.

Figure 2:
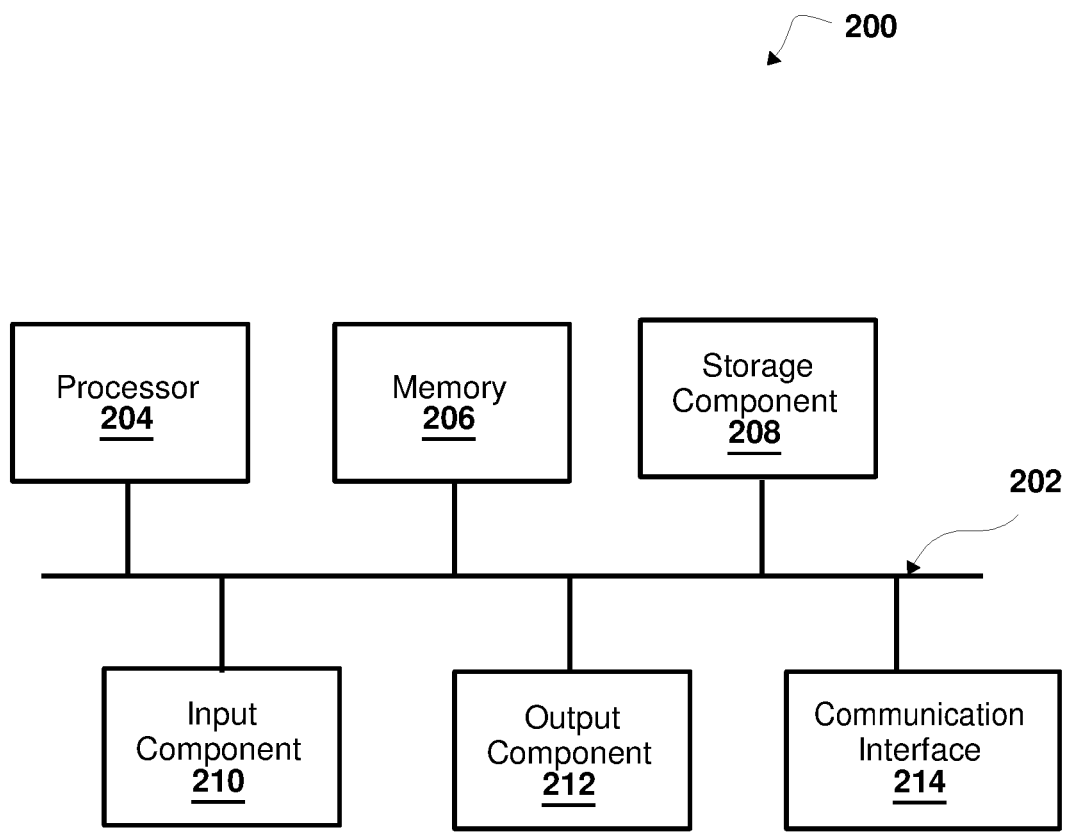
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), request data, aggregated data, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
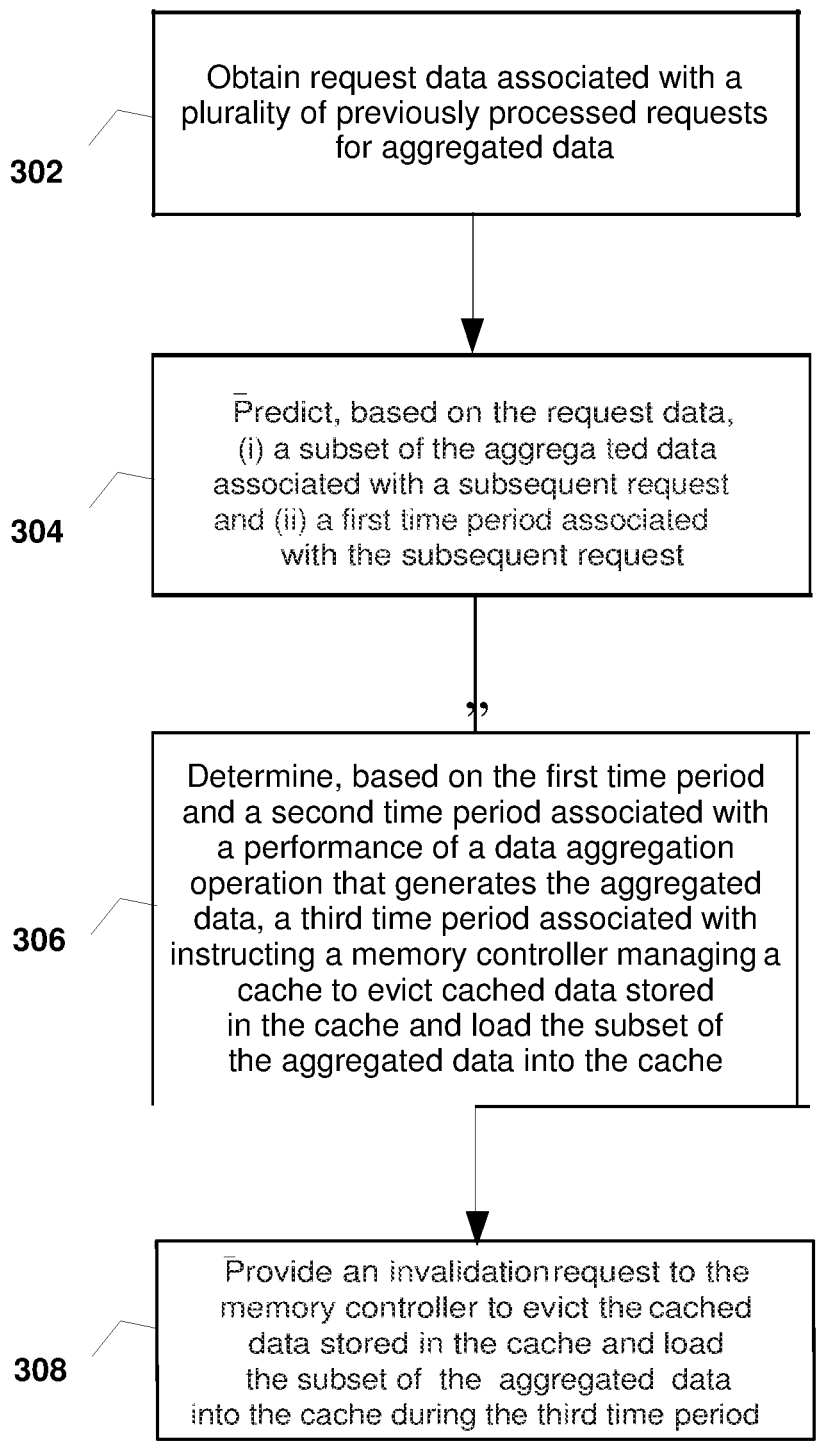
FIG. 3 is a flowchart of non-limiting embodiments or aspects of a process for maintaining a cache.

Referring now to FIG. 3, FIG. 3 is a flowchart of non-limiting embodiments or aspects of a process 300 for maintaining a cache. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining request data associated with a plurality of previously processed requests for aggregated data. For example, transaction service provider system 108 may obtain request data associated with a plurality of previously processed requests for aggregated data. In such an example, the plurality of previously processed requests may be associated with one or more requesting systems (e.g., one or more merchant systems 102, etc.).

In some non-limiting embodiments or aspects, a previously processed request may include a request for aggregated data associated with a requesting system that has been previously processed by transaction service provider system 108. For example, a previously processed request may be a request for a particular subset of the aggregated data at a particular time that has been previously received by transaction service provider system 108 at a time period (e.g., at the particular time, etc.) before a current time period. As an example, transaction service provider system 108 may have received the previously processed request and retrieved and/or provided the aggregated data (e.g., from a cache, from a relational database, etc.) associated with the request to the requesting system associated with the previously processed requested. In such an example, the aggregated data may be stored in a relational database and/or a distributed cache. For example, transaction service provider system 108 may store a portion of the aggregated data stored in the relational database as cached data in a distributed cache.

In some non-limiting embodiments or aspects, request data may include at least one of the following parameters associated with a previously processed request: one or more metrics of the aggregated data requested by the previously processed request, an amount of the aggregated data requested by the previously processed request, a time period at which the previously processed request is received and/or processed, a number of the previously processed request associated with a same time period, a subset of the aggregated data associated with the previously processed request, a time period associated with a performance of a data aggregation operation that generates the aggregated data, transaction data associated with one or more transactions, a subset of the aggregated data, or any combination thereof.

In some non-limiting embodiments or aspects, aggregated data may be generated by a data aggregation operation. For example, transaction service provider system 108 may perform a data aggregation operation on transaction data associated with a plurality of transactions with respect to each requesting system (e.g., merchant system 102, etc.) to generate the aggregated data associated with that requesting system. As an example, the data aggregation operation may include an ETL operation. In some non-limiting embodiments or aspects, the data aggregation operation is performed periodically to generate the aggregated data. In some non-limiting embodiments or aspects, the data aggregation operation may include an ETL operation. For example, an ETL operation may be performed periodically (e.g., daily, once each day, etc.) by maintaining a buffer (e.g., of 24 hours, etc.) between each performance of the ETL operation to ensure that the ETL operation has been performed successfully for each merchant system 102 before a next ETL operation for that merchant system 102 is initiated and/or performed.

In some non-limiting embodiments or aspects, the aggregated data is associated with a plurality of transactions, the aggregated data includes at least one metric associated with a requesting system, and the at least one metric includes an aggregation of at least one transaction parameter over the plurality of transactions associated with that requesting system. In such an example, aggregated data may include at least one of the following metrics: a number of transactions associated with a requesting system, an amount of the number of transactions associated with the requesting system, a number of transactions per a period of time (e.g., a second, etc.) associated with the requesting system, an amount of aggregated data associated with the requesting system (e.g., some merchant systems be associated with more data dimensions or parameters than other merchants, thereby increasing a cardinality and/or a size of the data, etc.), a periodic average transaction count (e.g., a daily average transaction count, etc.) associated with the requesting system, or any combination thereof.

In some non-limiting embodiments or aspects, transaction data may include parameters associated with a transaction, such as an account identifier (e.g., a PAN, etc.), a transaction amount, a transaction date and time, a type of product and/or service associated with the transaction, a conversion rate of currency, a type of currency, a merchant type, a merchant name, a merchant location, and/or the like.

As shown in FIG. 3, at step 304, process 300 includes predicting, based on request data, (i) a subset of the aggregated data associated with a subsequent request and (ii) a first time period associated with the subsequent request. For example, transaction service provider system 108 may predict, based on the request data, (i) a subset of the aggregated data associated with a subsequent request and (ii) a first time period associated with the subsequent request.

In some non-limiting embodiments or aspects, a subsequent request is a request received after a previously processed request. For example, a subsequent request may include a next request expected to be received from a requesting system after a previously processed request that has already been received and/or processed for that requesting system. In some non-limiting embodiments or aspects, the subsequent request is a first request predicted to be received from a requesting system after completion of the performance of the data aggregation operation for that requesting system. For example, a subsequent request (e.g., a predicted subsequent request, etc.) may include a subset of the aggregated data expected to be requested by the subsequent request (e.g., one or more metrics associated with the requesting system, etc.) and the first time period at which the subsequent request is expected to be received from the requesting system.

In some non-limiting embodiments or aspects, transaction service provider system 108 generates one or more probabilities associated with a prediction of (i) a subset of aggregated data associated with a subsequent request and/or (ii) a first time period associated with the subsequent request based on a machine learning technique (e.g., a pattern recognition technique, a data mining technique, a heuristic technique, a supervised learning technique, an unsupervised learning technique, etc.). For example, transaction service provider system 108 generates a neural network model (e.g., an estimator, a classifier, a prediction model, etc.) based on a machine learning algorithm (e.g., a Gaussian algorithm, a non-Gaussian algorithm, a chi-squared algorithm, a decision tree algorithm, a gradient boosted decision tree algorithm, a random forest algorithm, a neural network algorithm, a convolutional neural network algorithm, etc.). In such an example, transaction service provider system 108 generates the one or more probabilities using the neural network model.

In some non-limiting embodiments or aspects, transaction service provider system 108 generates the neural network model based on request data associated with a plurality of previously processed requests for aggregated data, to optimize an objective function. For example, the neural network model may be designed to receive, as an input, the request data, and provide, as an output, a prediction (e.g., a probability, a binary output, a yes-no output, a score, a prediction score, etc.) as to (i) a subset of aggregated data associated with a subsequent request and/or (ii) a first time period associated with the subsequent request (e.g., as to which resources are mostly requested and at what time of a day, etc.).

In some non-limiting embodiments or aspects, transaction service provider system 108 processes the request data to obtain training data for the model. For example, transaction service provider system 108 processes the request data to change the request data into a format that is analyzed (e.g., by transaction service provider system 108) to generate the model. The request data that is changed is referred to as training data. In some implementations, transaction service provider system 108 processes the request data to obtain the training data based on receiving the request data. Additionally, or alternatively, transaction service provider system 108 processes the request data to obtain the training data based on transaction service provider system 108 receiving an indication that transaction service provider system 108 is to process the request data from a user of transaction service provider system 108, such as when transaction service provider system 108 receives an indication to create a model for maintaining a cache.

In some non-limiting embodiments or aspects, transaction service provider system 108 processes the request data by determining one or more variables based on the request data. In some non-limiting embodiments or aspects, a variable includes a metric, which is derived based on the request data. The variable is analyzed to generate a model. For example, the variable includes a variable associated with one or more parameters associated with a previously processed request, one or more parameters associated with a transaction, one or more metrics associated with a plurality of transactions, a time period associated with a previously processed request, and/or a time period associated with a performance of a data aggregation operation that generates the aggregated data. In some non-limiting embodiments or aspects, the variable is a variable associated with one or more metrics of the aggregated data requested by the previously processed request, an amount of the aggregated data requested by the previously processed request, a time period, a number of the previously processed request associated with a same time period, and/or any other parameter and/or metric of the request data.

In some non-limiting embodiments or aspects, transaction service provider system 108 analyzes the training data to generate a neural network model (e.g., a classifier model, a prediction model, etc.). For example, transaction service provider system 108 uses machine learning techniques to analyze the training data to generate the neural network model. As an example, generating the neural network model (e.g., based on training data, etc.) is referred to as training the neural network model. In such an example, machine learning techniques may include supervised and/or unsupervised techniques, such as decision trees (e.g., gradient boosted decision trees), random forest algorithms, logistic regressions, artificial neural networks (e.g., convolutional neural networks, etc.), Bayesian statistics, Gaussian distributions, non-Gaussian distributions, chi-squared distributions, learning automata, Hidden Markov Modeling, linear classifiers, quadratic classifiers, association rule learning, and/or the like. In some non-limiting embodiments or aspects, the neural network model includes a classifier model that is specific to a particular requesting system (e.g., a particular merchant system 102, etc.) and/or the like.

Additionally, or alternatively, when analyzing the training data, transaction service provider system 108 identifies one or more variables (e.g., one or more independent variables) as predictor variables that are used to make a prediction (e.g., when analyzing the training data). In some implementations, values of the predictor variables are inputs to the model. For example, transaction service provider system 108 identifies a subset (e.g., a proper subset) of variables as predictor variables that are used to accurately predict (i) a subset of aggregated data associated with a subsequent request and/or (ii) a first time period associated with the subsequent request. In some implementations, the predictor variables include one or more of the variables, as discussed above, that have a significant impact (e.g., an impact satisfying a threshold) on a probability that (i) the subset of aggregated data is associated with the subsequent request and/or (ii) the first time period is associated with the subsequent request.

In some non-limiting embodiments or aspects, transaction service provider system 108 validates the neural network model by providing validation data associated with one or more previously processed requests for aggregated data, and determining, based on an output of the neural network model, whether the neural network model correctly, or incorrectly, predicted (i) the subset of aggregated data associated with the subsequent request and/or (ii) the first time period associated with the subsequent request. For example, transaction service provider system 108 may validate the neural network model based on a validation threshold (e.g., a threshold value of the validation data, etc.). As an example, transaction service provider system 108 may be programmed and/or configured to validate the model when (i) the subset of the aggregated data associated with the subsequent request and/or (ii) the first time period associated with the subsequent request is correctly predicted by the model (e.g., when the prediction model correctly predicts 50% of the validation data, when the prediction model correctly predicts 70% of the validation data, etc.).

In some non-limiting embodiments or aspects, after the neural network model has been validated, transaction service provider system 108 may further train and/or update the neural network model and/or create new models based on receiving new training data. In some non-limiting embodiments or aspects, the new training data includes request data associated with one or more new and/or current requests and/or one or more subsequent requests to the one or more new and/or current requests that is different from the plurality of previously processed requests.

In some non-limiting embodiments or aspects, after the neural network model has been trained and/or validated, transaction service provider system 108 provides a trained neural network. For example, transaction service provider system 108 may store the trained neural network model (e.g., store the neural network model for later use, etc.). In some non-limiting embodiments or aspects, transaction service provider system 108 stores the trained neural network model in a data structure (e.g., a database, a linked list, a tree, etc.). In some non-limiting embodiments or aspects, the data structure is located within transaction service provider system 108 and/or external (e.g., remote from) transaction service provider system 108. In some non-limiting embodiments or aspects, transaction service provider system 108 provides the trained neural network model to another system or device of transaction processing network 101, such as issuer system 110, and/or the like.

Figure 4:
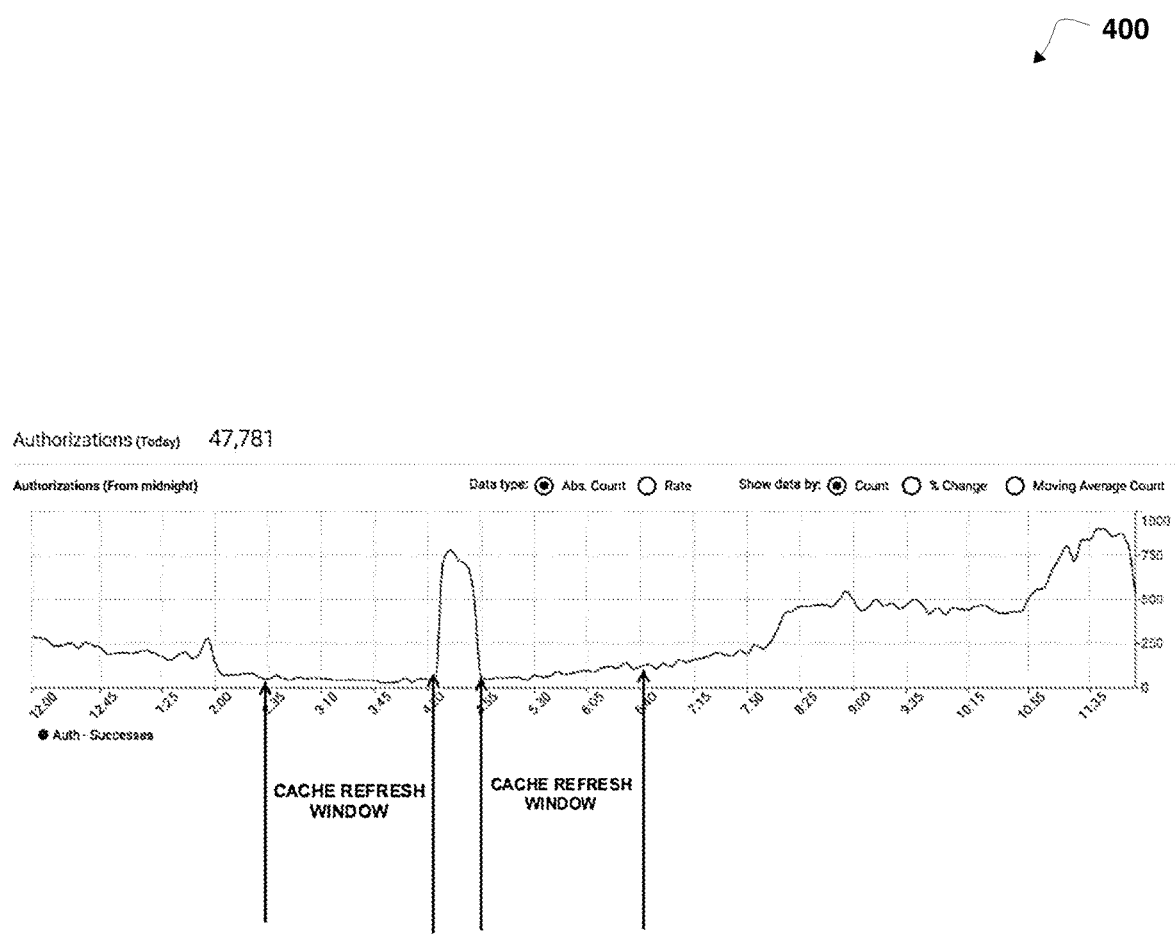
FIG. 4 is a graph of a cache refresh window determined according to non-limiting embodiments or aspects of a process for maintaining a cache.

In some non-limiting embodiments or aspects, transaction service provider system 108 maintains a cache (e.g., a distributed cache, etc.) based on the one or more prediction scores generated by the trained neural network. For example, and referring also to graph 400 as shown in FIG. 4, transaction service provider system 108 may predict the individual incoming requests distribution over time between data aggregation operations (e.g., a daily distribution, etc.) for each merchant and/or the subsets of the aggregated data expected to be requested in that distribution. As an example, if a Gaussian distribution is obtained by plotting time in hours (e.g., in a day, etc.) against a count of previously processed requests for a given merchant, transaction service provider system 108 may determine, based on the distribution, a time of invalidation for the cache (e.g., a cache refresh window as shown in FIG. 4) as when an ETL operation is completed and a fewest number of requests is expected to be received.

As shown in FIG. 3, at step 306, process 300 includes determining, based on the first time period and a second time period associated with a performance of a data aggregation operation that generates the aggregated data, a third time period associated with instructing a memory controller managing a cache to evict cached data stored in the cache and load a subset of a aggregated data into the cache. For example, transaction service provider system 108 may determine, based on the first time period and a second time period associated with a performance of a data aggregation operation (e.g., an ETL operation, etc.) that generates the aggregated data, a third time period associated with instructing a memory controller managing a cache to evict cached data stored in the cache and load a subset of a aggregated data into the cache. As an example, transaction service provider system 108 may determine, based on the distribution, a time of invalidation for the cache as a time at which the performance of the data aggregation operation is completed and a fewest number of requests is expected to be received.

In some non-limiting embodiments or aspects, the plurality of previously processed requests is associated with a plurality of requesting systems, the subsequent request includes a plurality of subsequent requests associated with the plurality of requesting systems, and the plurality of requesting systems is associated with a plurality of priority levels. For example, transaction service provider system 108 may determine the third time period based on the plurality of priority levels. As an example, transaction service provider system 108 may dynamically determine a time period for invalidating and loading the cache according to the priority levels associated with the plurality of merchants. In such an example, if the subset of the aggregated data for a higher priority merchant system (e.g., a larger merchant system, etc.) is predicted to be cached at a time each day such that cache resources are monopolized thereby, transaction service provider system 108 may reschedule a subset of aggregated data for another, lower priority merchant system (e.g., a smaller merchant system, etc.) that would otherwise be loaded at the same time to a different time that does not conflict with the cache invalidation and loading operation for the higher priority merchant. Accordingly, by weighting request data and merchant priority levels, transaction service provider system 108 can improve cache invalidation and loading to provide a better experience to requesting systems given limited caching resources.

In some non-limiting embodiments or aspects, the data aggregation operation includes a plurality of data aggregation operations associated with the plurality of requesting systems. For example, transaction service provider system 108 may determine the third time period by modifying at least one data aggregation operation associated with at least one requesting system of the plurality of requesting systems based on the plurality of priority levels. As an example, transaction service provider system 108 may dynamically reschedule an ETL operation associated with a first merchant that causes a conflict (e.g., due to monopolization or overloading of cache resources, etc.) with an ETL operation associated with a second merchant different than the first merchant. As another example, transaction service provider system 108 may dynamically change a number of threads and/or throttle one or more threads of an ETL operation associated with a first merchant that causes a conflict (e.g., due to monopolization or overloading of cache resources, etc.) with an ETL operation associated with a second merchant different than the first merchant.

As shown in FIG. 3, at step 308, process 300 includes providing an invalidation request to a memory controller to evict cached data stored in the cache and load a subset of aggregated data into the cache during a third time period. For example, transaction service provider system 108 may provide an invalidation request to a memory controller to evict cached data stored in the cache and load a subset of aggregated data into the cache during a third time period. As an example, transaction service provider system 108 may provide an invalidation request to the memory controller managing the cache to evict the cached data stored in the cache and load the subset of the aggregated data into the cache during the third time period. In such an example, the memory controller may receive the invalidation request, evict the cached data stored in the cache, and load the subset of the aggregated data in to the cache during the third time period. The memory controller and/or the cache may be implemented completely within transaction service provider system 108, partially within transaction service provider system 108 and partially remote and/or separate from transaction service provider system 108, and/or completely remote and/or separate from transaction service provider system 108.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
    obtaining, with at least one processor, request data associated with a plurality of previously processed requests for aggregated data;
    predicting, with at least one processor, based on the request data, (i) a subset of the aggregated data associated with a subsequent request and (ii) a first time period associated with the subsequent request;
    determining, with at least one processor, based on the first time period and a second time period associated with a performance of a data aggregation operation that generates the aggregated data, a third time period associated with instructing a memory controller managing a cache to evict cached data stored in the cache and load the subset of the aggregated data into the cache; and
    providing, with at least one processor, an invalidation request to the memory controller managing the cache to evict the cached data stored in the cache and load the subset of the aggregated data into the cache during the third time period,
    wherein the subsequent request is a first request predicted to be received after completion of the performance of the data aggregation operation.

2. The computer-implemented method of claim 1, wherein the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

3. The computer-implemented method of claim 1, wherein the data aggregation operation is performed periodically to generate the aggregated data.

4. A computer-implemented method, comprising:
    obtaining, with at least one processor, request data associated with a plurality of previously processed requests for aggregated data;
    predicting, with at least one processor, based on the request data, (i) a subset of the aggregated data associated with a subsequent request and (ii) a first time period associated with the subsequent request;
    determining, with at least one processor, based on the first time period and a second time period associated with a performance of a data aggregation operation that generates the aggregated data, a third time period associated with instructing a memory controller managing a cache to evict cached data stored in the cache and load the subset of the aggregated data into the cache; and
    providing, with at least one processor, an invalidation request to the memory controller managing the cache to evict the cached data stored in the cache and load the subset of the aggregated data into the cache during the third time period,
    wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, and wherein determining the third time period is further based on the plurality of priority levels.

5. The computer-implemented method of claim 4, wherein the data aggregation operation includes a plurality of data aggregation operations associated with the plurality of requesting systems, and wherein determining the third time period further includes modifying at least one data aggregation operation associated with at least one requesting system of the plurality of requesting systems based on the plurality of priority levels.

6. A computer-implemented method, comprising:
    obtaining, with at least one processor, request data associated with a plurality of previously processed requests for aggregated data;
    predicting, with at least one processor, based on the request data, (i) a subset of the aggregated data associated with a subsequent request and (ii) a first time period associated with the subsequent request;
    determining, with at least one processor, based on the first time period and a second time period associated with a performance of a data aggregation operation that generates the aggregated data, a third time period associated with instructing a memory controller managing a cache to evict cached data stored in the cache and load the subset of the aggregated data into the cache; and
    providing, with at least one processor, an invalidation request to the memory controller managing the cache to evict the cached data stored in the cache and load the subset of the aggregated data into the cache during the third time period, wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

7. A computing system comprising:
one or more processors programmed and/or configured to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the subsequent request is a first request predicted to be received after completion of the performance of the data aggregation operation.

8. The computing system of claim 7, wherein the request data includes at least one of the following parameters associated with a previously processed request: one or more metrics of the aggregated data requested by the previously processed request, an amount of the aggregated data requested by the previously processed request, a time period, a number of the previously processed request associated with a same time period, or any combination thereof.

9. The computing system of claim 7, wherein the data aggregation operation is performed periodically to generate the aggregated data.

10. A computing system comprising:
one or more processors programmed and/or configured to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, and wherein the third time period is further determined based on the plurality of priority levels.

11. The computing system of claim 10, wherein the data aggregation operation includes a plurality of data aggregation operations associated with the plurality of requesting systems, and wherein the one or more processors further determine the third time period by modifying at least one data aggregation operation associated with at least one requesting system of the plurality of requesting systems based on the plurality of priority levels.

12. A computing system comprising:
one or more processors programmed and/or configured to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

13. A computer program product comprising at least one non-transitory computer-readable medium including program instructions that, when executed by at least one processor, cause the at least one processor to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the subsequent request is a first request predicted to be received after completion of the performance of the data aggregation operation.

14. The computer program product of claim 13, wherein the request data includes at least one of the following parameters associated with a previously processed request:

one or more metrics of the aggregated data requested by the previously processed request, an amount of the aggregated data requested by the previously processed request, a time period, a number of the previously processed request associated with a same time period, or any combination thereof.

15. The computer program product of claim 13, wherein the data aggregation operation is performed periodically to generate the aggregated data.

16. A computer program product comprising at least one non-transitory computer-readable medium including program instructions that, when executed by at least one processor, cause the at least one processor to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the plurality of previously processed requests is associated with a plurality of requesting systems, wherein the subsequent request includes a plurality of subsequent requests associated with the plurality of requesting systems, wherein the plurality of requesting systems is associated with a plurality of priority levels, wherein the third time period is further determined based on the plurality of priority levels, wherein the data aggregation operation includes a plurality of data aggregation operations associated with the plurality of requesting systems, and wherein the one or more processors further determine the third time period by modifying at least one data aggregation operation associated with at least one requesting system of the plurality of requesting systems based on the plurality of priority levels.

17. A computer program product comprising at least one non-transitory computer-readable medium including program instructions that, when executed by at least one processor, cause the at least one processor to:
   obtain request data associated with a plurality of previously processed requests for aggregated data;
   predict, based on the request data, (i) a subset of the aggregated data associated with a subsequent request and (ii) a first time period associated with the subsequent request;
   determine, based on the first time period and a second time period associated with a performance of a data aggregation operation that generates the aggregated data, a third time period associated with instructing a memory controller managing a cache to evict cached data stored in the cache and load the subset of the aggregated data into the cache; and
   provide an invalidation request to the memory controller managing the cache to evict the cached data stored in the cache and load the subset of the aggregated data into the cache during the third time period,
   wherein the aggregated data is associated with a plurality of transactions, wherein the aggregated data includes at least one metric associated with a requesting system, and wherein the at least one metric includes an aggregation of at least one transaction parameter over the plurality of transactions associated with that requesting system.

* * * * *